United States Patent [19]
Kamiya et al.

[11] Patent Number: 5,662,393
[45] Date of Patent: Sep. 2, 1997

[54] BRAKING FORCE CONTROL DEVICE AND METHOD THEREOF

[75] Inventors: Masahiko Kamiya, Anjo; Yuzo Imoto, Chita-gun; Masayoshi Oishi, Anjo, all of Japan

[73] Assignee: Nippondenso Co., Ltd., Kariya, Japan

[21] Appl. No.: 544,542

[22] Filed: Oct. 18, 1995

[30]   Foreign Application Priority Data

Nov. 2, 1994 [JP] Japan ................................ 6-269874
Aug. 9, 1995 [JP] Japan ................................ 7-203450

[51] Int. Cl.⁶ ................................................ B60T 8/58
[52] U.S. Cl. ........................................ 303/194; 303/191
[58] Field of Search ................................ 303/157, 158, 303/191, 194, 195, 196; 364/426.01, 426.02

[56]   References Cited

U.S. PATENT DOCUMENTS

| | | | |
|---|---|---|---|
| 3,630,578 | 12/1971 | Kaiser | 303/195 |
| 4,333,146 | 6/1982 | Sinha et al. | 303/194 X |
| 4,965,729 | 10/1990 | Hafner | 303/196 X |
| 4,976,330 | 12/1990 | Matsumoto | 303/194 X |
| 5,108,159 | 4/1992 | Tsang et al. | 303/191 |
| 5,454,630 | 10/1995 | Zhang | 303/175 |

FOREIGN PATENT DOCUMENTS

| | | |
|---|---|---|
| 60-213556 | 10/1985 | Japan . |
| 3-007648 | 1/1991 | Japan . |
| 3-227711 | 10/1991 | Japan . |
| 5-133831 | 5/1993 | Japan . |

*Primary Examiner*—Lee W. Young
*Attorney, Agent, or Firm*—Cushman, Darby, & Cushman IP Group of Pillsbury Madison & Sutro LLP

[57]   ABSTRACT

To provide optimal braking force control using braking operation data, an ECU in a brake force control system detects a braking operation according to fluctuation components of wheel rotation. That is, the ECU calculates the wheel acceleration and sets a reference load level for the braking operation according to a road surface coefficient of friction at the wheel tire. When the amplitude of the wheel acceleration increases and exceeds the reference load level, the braking load is determined to be heavy. If the braking load is heavy, the ECU decreases the brake oil pressure of the wheel being detected. In this way, the slip ratio can be controlled around a peak road surface coefficient of friction.

19 Claims, 17 Drawing Sheets

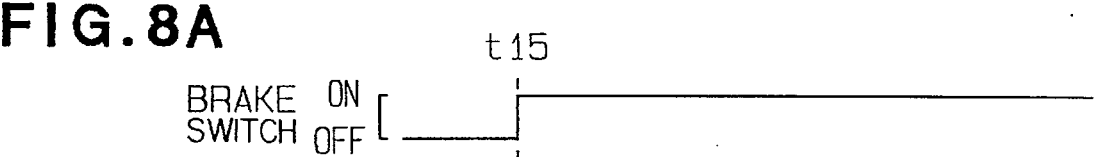
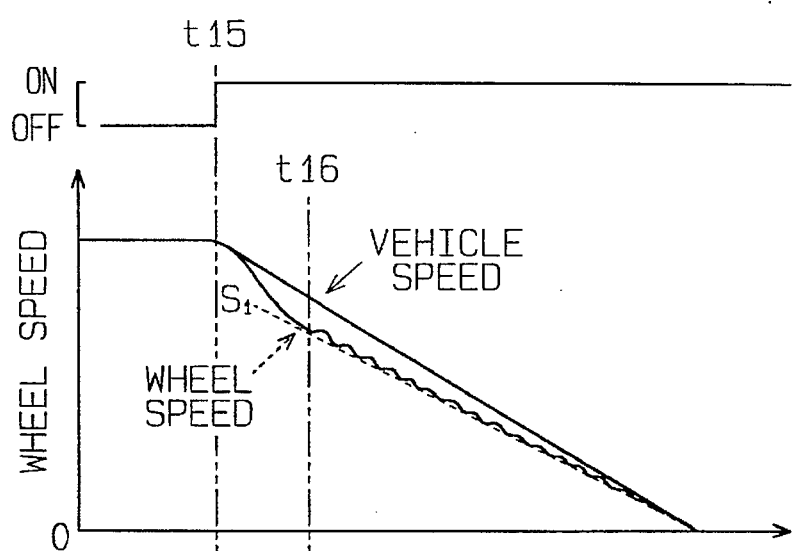
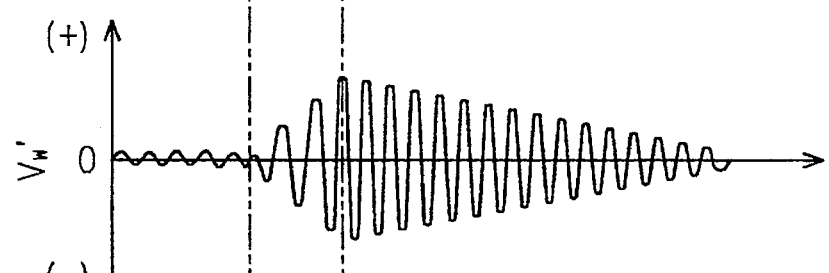
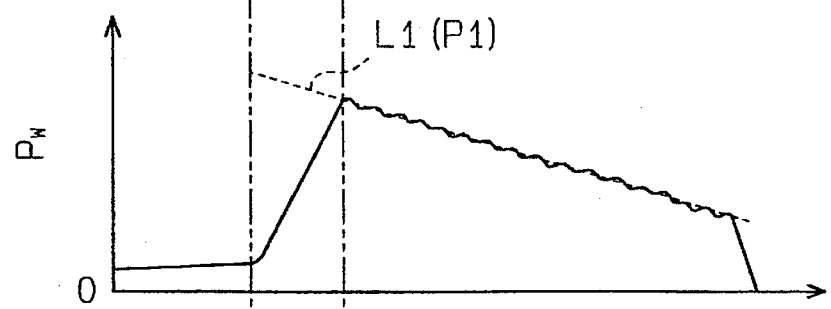
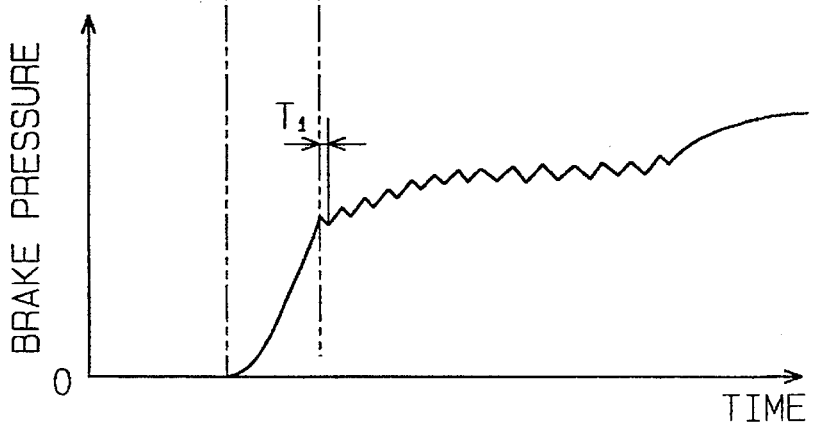

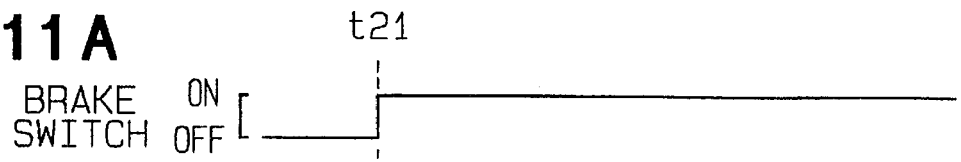
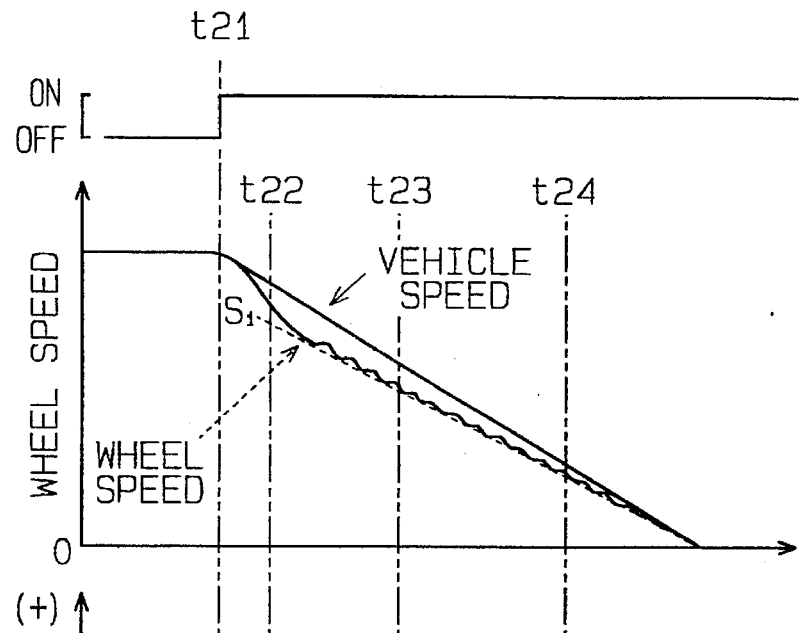
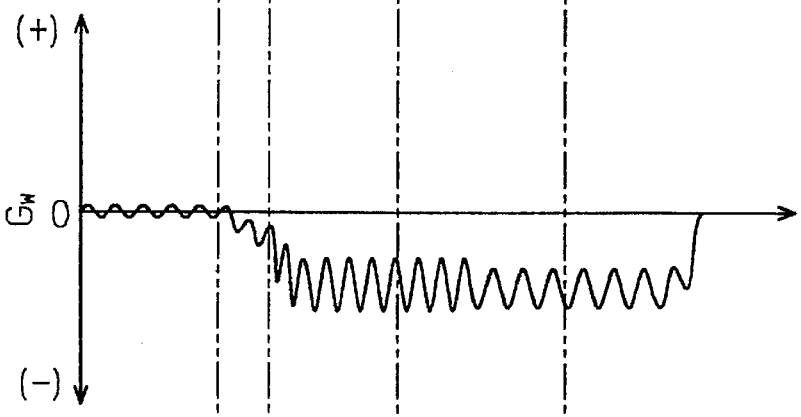
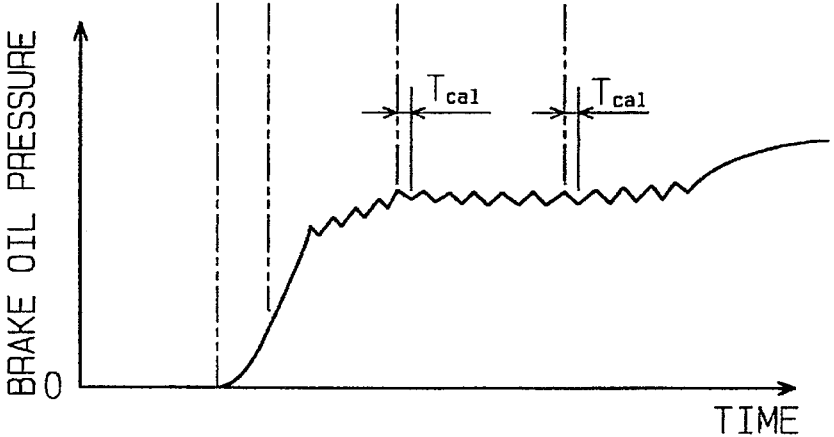

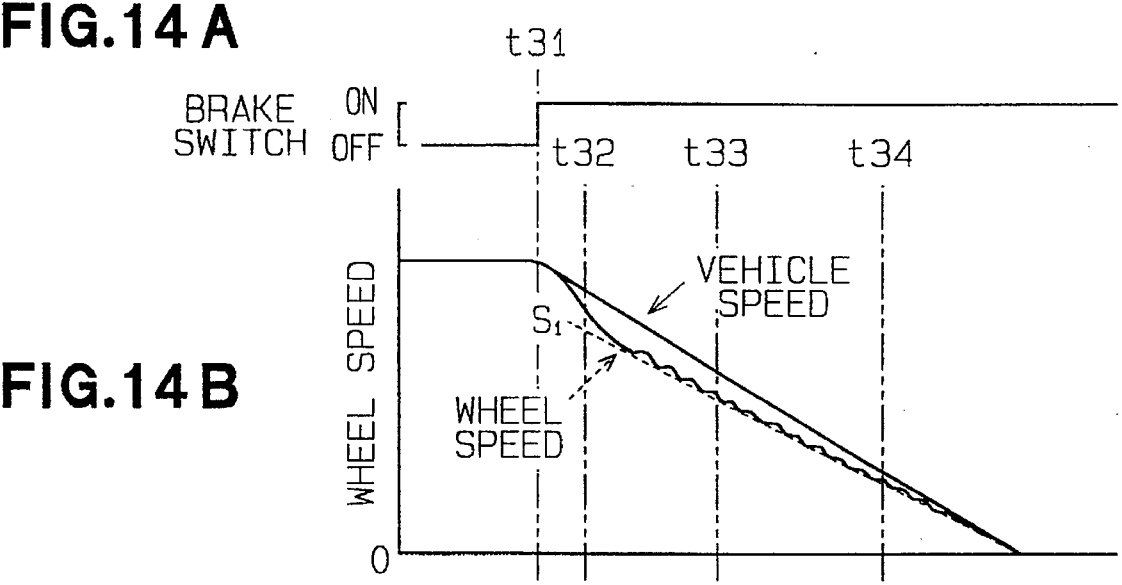
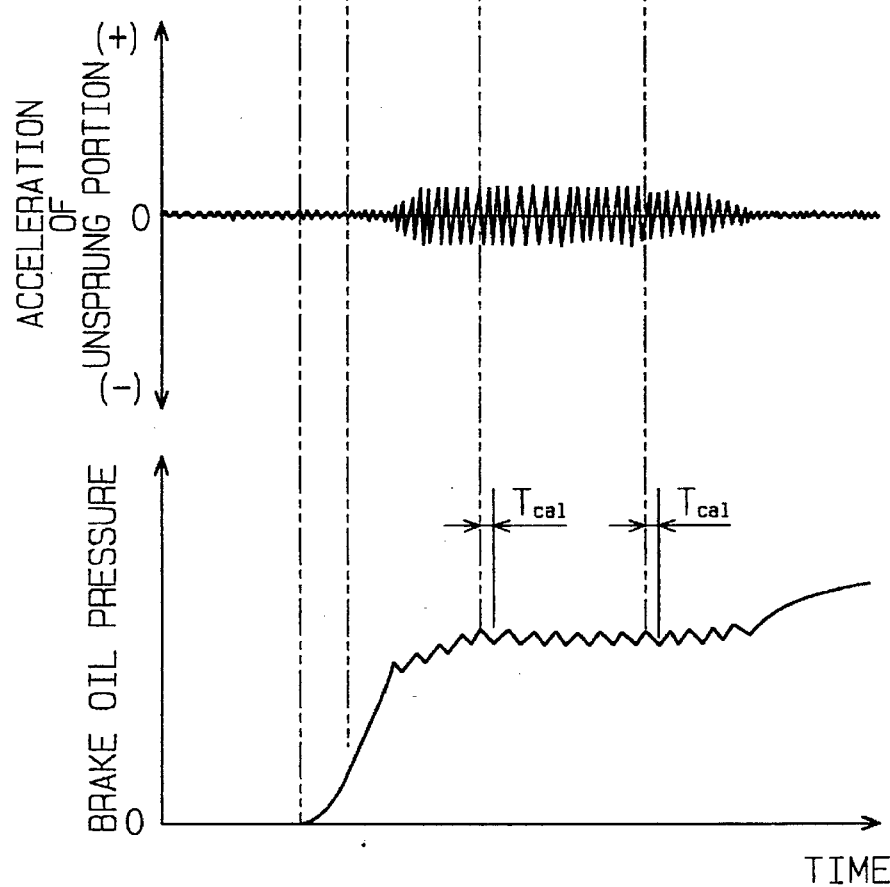

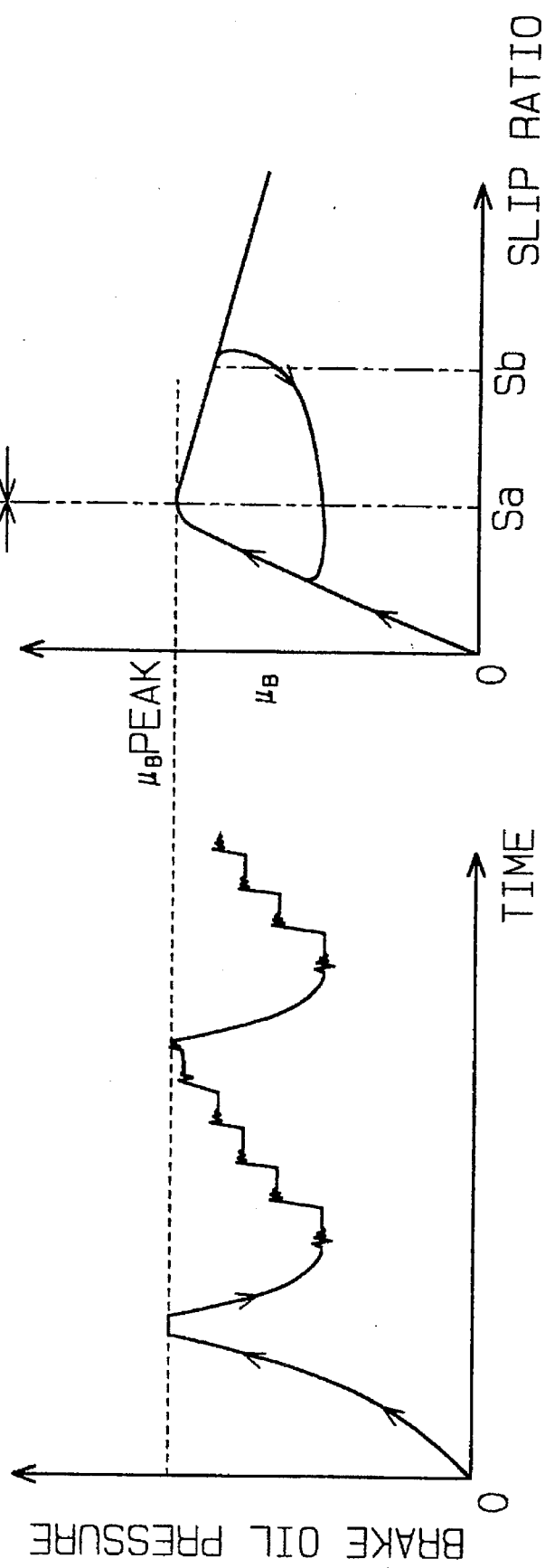

BRAKING FORCE CONTROL DEVICE AND METHOD THEREOF

CROSS REFERENCE TO RELATED APPLICATIONS

The present application is based on and claims priority from Japanese Patent Applications Hei 6-269874 filed on Nov. 2, 1994 and Hei 7-203450 filed on Aug. 9, 1995, the contents of which are incorporated herein by reference.

BACKGROUND OF THE INVENTION

1. Field of the invention

The present invention relates to a braking force control device which controls braking force applied to vehicle wheels in order to restrain the slip of the wheels.

2. Description of the Related Art

This kind of braking force control device controls the braking force applied to the wheels to restrain the wheel deceleration slip (lock), and is well-known as an anti-skid control system or an anti-lock braking system (hereinafter referred to as the ABS unit). In such an ABS unit, the wheel speed decreases as a driver actuates a brake pedal, and when the wheel slip becomes an ABS-control level (or, pressure decreasing level), the brake oil pressure decreases to prevent the wheel slip, and increases again after the wheel speed increases.

On the other hand, the above ABS unit controls the braking force according to the coefficient μB of the braking friction (hereinafter referred to as the μB characteristic) shown in FIGS. 17A and 17B. In other words, a range of slip ratio under Sa (optimum slip ratio) which corresponds to a peak value of the μB characteristic (hereinafter referred to as μB peak) is a relatively stable range and a range above Sa is unstable and may cause the wheel locking. In the stable range, the braking friction increases as slip increases with high lateral-holding force. In the unstable range, the braking operation becomes unstable because of the slip in excess of Sa. If the brake oil pressure is decreased before the slip ratio becomes Sa in ABS control, braking force may not increase sufficiently, thereby causing a long stopping distance. Therefore, the slip ratio to start the ABS control is set slightly above Sa in order to shorten the stopping distance.

However, the above conventional ABS unit can not achieve the ABS control at the ideal slip ratio. That is, the μB characteristic (μB peak) shown in FIGS. 17A and 17B and the Sa change as the road surface condition changes, and the range for the maximum braking force (slightly above Sa) also changes with the road surface condition. Accordingly, there is a possibility that an actual pressure decreasing slip ratio Sb shifts to the unstable range considerably from the optimum slip ratio Sa as shown in FIG. 17B. In this case, the pressure starts decreasing after an optimum timing, thereby causing unstable running of the vehicle and excessive pressure decrease due to abnormal slip.

SUMMARY OF THE INVENTION

The present invention is made in view of the above problems, and a primary object of the present invention is to provide a braking force controlling device and a method of operating the same which enable braking control in an optimum range by use of information on a braking operation.

In order to achieve the above object, the device includes means for detecting vibration change of a wheel when braking force is applied thereto, means for deciding actual braking operation according to the change in the vibration and means for changing braking force according to the above decision.

When braking force is applied to the wheels, the wheel speed starts falling and a maximum braking force can be obtained at an optimum slip ratio which corresponds to the μB peak. The braking operation is given as a marginal level relative to a braking range for the maximum braking force, and when the marginal level equals 0 it means that the braking operation is the optimum braking operation. When μB changes in brake operation, wheel tire vibration changes, because as the slip ratio of the tire in contact with the road surface comes near the μB peak, it becomes unstable gradually between a sticky state and a slippery state. Therefore, a tendency of the slip ratio approaching the μB peak can be detected from the change in the wheel vibration and change in the braking condition (marginal level) can be detected from the change in the wheel vibration. The above invention enables delicate braking control according to the braking operation and therefore optimum braking force control can be provided. Vibration of unsprung portions of the vehicle connected to the wheels such as suspensions, parts of the brake system or axles also change as the vibration of the wheels changes. Therefore, the vibration of the wheels can be detected from somewhere in the unsprung portions other than the wheel tires and related parts.

Another object of the present invention is to provide a braking force control device in which when the braking force exceeds an upper limit of the range for the maximum braking force, it is decreased. In this control the brake oil pressure may be decreased or held constant. Thus, an optimum braking operation at an optimum timing or optimum brake oil pressure control to control the wheels accurately near the μB peak is provided.

Another object of the present invention is to provide a braking force control device including a vibration change detecting means. The vibration change detecting means detects vibration change which is generated along with rotation change of the wheel. The rotation change is generated by a reaction force of the road surface when braking force is applied to the wheels, and the amount of the reaction force is closely related to the wheel slip which is affected by the friction coefficient of the road surface and the braking force. Therefore, an optimum slip condition can be maintained by detecting the reaction force accurately.

Another object of the present invention is to provide a braking force control device including means which detects a rotational speed of the wheel and frequency analyzing means which detects a peak characteristic of the rotational speed signal in a specific frequency range. The braking operation deciding means decides the actual braking operation according to the peak characteristic of the rotational speed signal in the specific frequency range. The frequency analyzing means takes out a component of a specific frequency range of the wheel rotational speed by using a device such as a band pass filter, and detects a vibration power level (e.g., a signal of an effective value of the wheel rotational speed passing through the filter). The specific frequency range is set to include a resonant frequency of a part of the unsprung portions or the wheel tire. In this case, the vibration power level of the wheel rotational speed in the specific frequency range increases at portions around the μB peak. Therefore, this vibration power level is effective to detect the braking operation accurately.

A further object of the present invention is to provide a braking force control device including vibration change detecting means which detects rotational acceleration of the wheel and the frequency analyzing means which detects a peak characteristic of the wheel acceleration in a specific frequency range. The actual braking operation deciding means decides the actual braking operation of the vehicle according to the peak characteristic of the wheel acceleration in the specific frequency range. The frequency analyzing means according to this aspect of the invention converts time-related data of the wheel acceleration to frequency-related data using a fast Fourier transformation circuit (FFT) or the like. The specific frequency range is set to include a resonant frequency of a part of the unsprung portions. In this case, the peak level of the wheel acceleration in the specific frequency range increases at portions around the μB peak. Therefore, this peak level is effective to detect the braking operation accurately.

A further object of the present invention is to provide a braking force control device including vibration change detecting means which detects vibration change of an unsprung portion of the vehicle including the wheels such as acceleration of vibration and a frequency analyzing means which detects a peak characteristic of the acceleration of the vibration in a specific frequency range. The actual braking operation deciding means decides a braking operation of the vehicle according to the peak characteristic of the acceleration of the vibration in the specific frequency range. The actual braking operation deciding means decides the actual braking operation according to the vibration change of the unsprung portion. The frequency analyzing means converts time-related data of the wheel acceleration to frequency-related data, using a fast Fourier transformation circuit (FFT) or the like. The specific frequency range is set to correspond to a vibration frequency of a part of the unsprung portions. In this case, the peak level of the wheel acceleration in the specific frequency range increases at portions around the μB peak. Therefore, this peak level (or peak frequency) is effective to detect the braking operation accurately.

A further object of the present invention is to provide a braking force control device including a braking force changing means which drives the oil pressure control actuator according to the actual braking operation. In this case, the pressure of the brake oil supplied to the wheel cylinders is continuously controlled to prevent excessive fluctuation of the brake oil pressure. As a result, the braking force controlling device prevents bad influences on the control accuracy by the fluctuation of the pressure oil.

A further object of the present invention is to provide a braking force control device including a wheel slip detecting means which detects slip of the wheel. The braking force changing means restrains increase of the braking force when either one of levels of the braking operation and the slip exceeds respective reference level. Therefore, an optimum braking force control for every braking condition is provided. Even if sudden abnormal slip takes place, it is eliminated instantly.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 8A, 8B, 8C and 8D are timing charts showing the operation of the second embodiment;

FIGS. 11A, 11B, 11C and 11D are timing charts showing the operation of the third embodiment;

FIGS. 14A, 14B, 14C and 14D are timing charts showing the operation of the fourth embodiment;

FIGS. 17A and 17B are charts showing $\mu_B$ characteristic of a conventional device.

DETAILED DESCRIPTION OF THE PREFERRED EMBODIMENT

Preferred embodiments will be described with reference to appended drawings hereafter.

FIRST EMBODIMENT

A first embodiment of the present invention will be described with reference to the appended drawings next.

Figure 1:
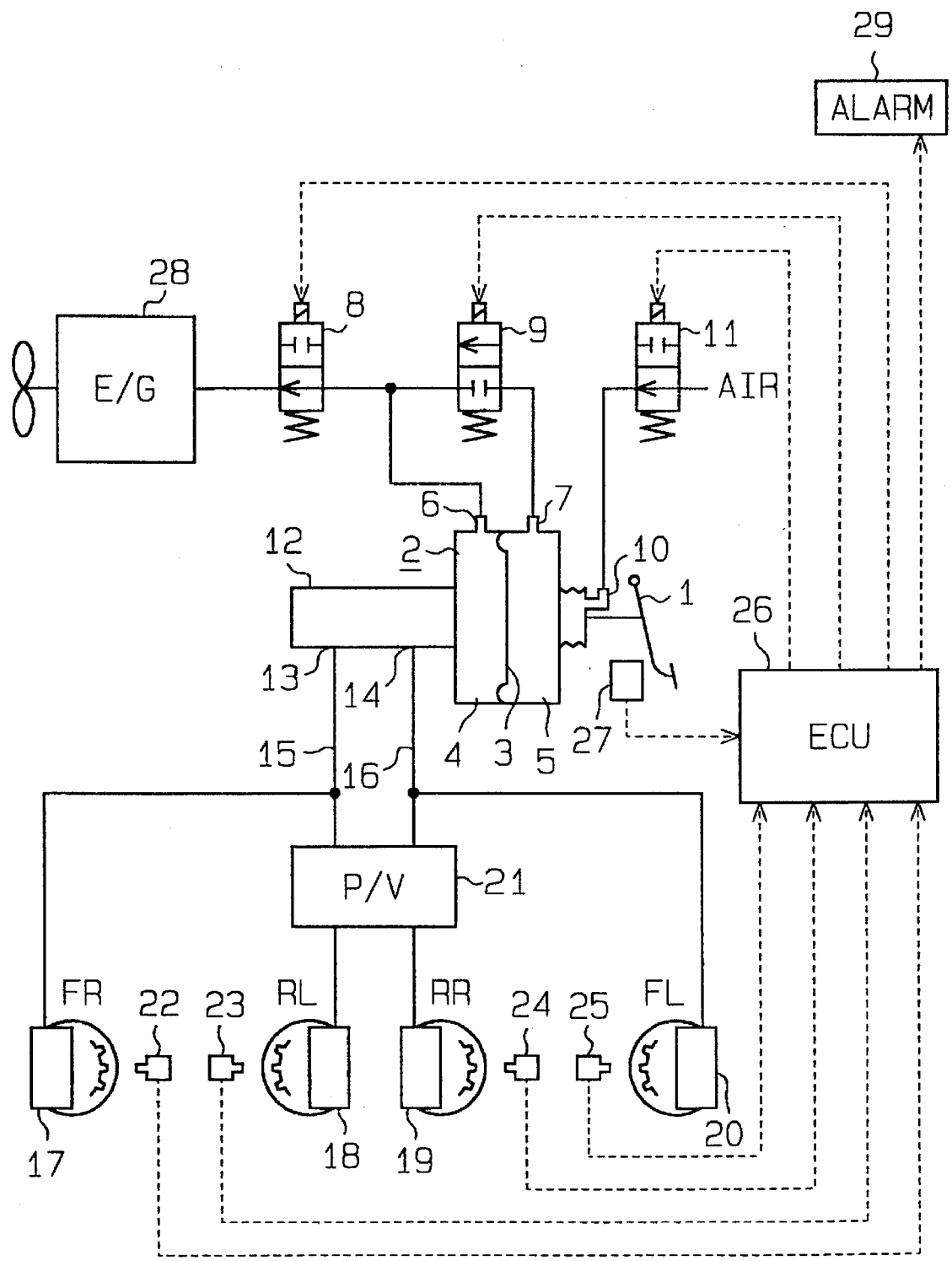
FIG. 1 is a circuit diagram illustrating the general structure of an ABS unit for a vehicle.

FIG. 1 illustrates a braking force control device which is referred to as an ABS (antilock brake system) unit hereafter. The ABS unit according to the first embodiment is composed of X-shaped dual pressure-pipes (or diagonal pipes). In the ABS unit, a brake pedal 1 is connected to a vacuum-type brake booster 2, which is connected to a tandem-type master cylinder 12. The brake booster 2 utilizes vacuum pressure generated in the intake manifold of an engine 28 and applies increased braking force to the master cylinder 12 when the brake pedal 1 is operated.

In more detail, the brake booster 2 is provided with two power cylinders 4 and 5 divided by a diaphragm 3. The first and second cylinders 4 and 5 have vacuum intake ports 6 and 7 respectively, through which the vacuum pressure in the intake manifold is introduced. The pressure level is controlled by first and second vacuum pressure control valves 8 and 9. They are composed of electromagnetic dual-position-valves and controlled by an ECU 26 to switch on and off the vacuum pressure. When the ECU 26 sends no signal (when the coils of the electromagnetic valves 8 and 9 are not energized), the vacuum pressure control valve 8 stays open and the second vacuum pressure valve 9 stays closed (as shown in FIG. 1).

The atmospheric pressure is introduced to the second power cylinder 5 through an air intake port 10. The atmospheric pressure is Changed according to the operation of the brake pedal by a pressure adjusting valve (not shown) and introduced to the second power cylinder 5, thereby producing a significant pressure difference from the pressure in the first power cylinder 4. The air intake port 10 is switched on and off by an air control valve 11 which is composed of an electromagnetic dual position valve. When the air control valve 11 receives no signal from the ECU 26 (when the coil is not energized), it stays open (as shown in FIG. 1).

The master cylinder 12 has a first oil port 13 and a second oil port 14. The first oil port 13 is connected to a front right (FR) wheel cylinder 17 and a rear left (RL) wheel cylinder 18 through a first oil pipe 15, and the second oil port 14 is connected to a rear right (RR) wheel cylinder 19 and a front left (FL) wheel cylinder 20 through a second oil pipe 16. A proportioning valve 21 (P valve) is disposed in the oil pipes 15 and 16 for the left and right wheels of the rear side (RL and RR) to provide an oil pressure difference between the front wheel cylinders and the rear wheel cylinders.

The wheels have wheel speed sensors 22, 23, 24 and 25 respectively, which generate signals to be applied to the ECU (or electronic control unit) 26. The wheel speed sensors 22 through 25 are composed of electromagnetic pickups or photoelectronic sensors. The brake pedal 1 is equipped with a brake switch 27 which detects the pedal operation and sends a signal to the ECU 26.

The ECU 26 is mainly composed of a microprocessor and calculates an estimate vehicle speed according to signals from the respective wheel speed sensors 22 through 25 and also calculates slip rates of the respective wheels according to the estimate vehicle speed and the wheel speed. The ECU 26 provides an ABS control mode according to the slip ratio of the respective wheels and controls the pressure of the brake oil to be either increasing, holding or decreasing. In the first embodiment, the ECU 26 includes an operation detecting unit, a brake condition detecting unit and a brake force control unit.

The operation of the ABS unit in the ABS control modes (pressure increasing mode, holding mode and pressure decreasing mode) is described below.

In the pressure increasing mode (shown in FIG. 1), the ECU 26 controls the first vacuum pressure control valve 8 to open, the second vacuum control valve to close and the air control valve 11 to open. Then, the first power cylinder 4 receives the intake vacuum pressure of the engine 28 and the second power cylinder 5 receives the atmospheric pressure through the air intake port 10. The booster 2 increases the force applied to the master cylinder 12 in response to the pressure difference between the intake vacuum pressure and the pressure in the second power cylinder 5 which is adjusted by the pressure adjusting valve (not shown), according to the operation of the brake pedal. As a result, the oil pressure in the wheel cylinders 17 through 20 increases.

In the pressure holding mode, the ECU 26 controls the first vacuum pressure control valve to close, the second vacuum pressure control valve to close and the air control valve 11 to close. Then, the vacuum pressure and the atmospheric pressure are disconnected from the first and the second power cylinders 4 and 5, so that the pressure difference between the first power cylinder 4 and the second power cylinder 5 remains unchanged. Thus, the oil pressure in the master cylinder 12 and the brake oil pressure in the wheel cylinders 17 through 20 are held constant.

In the pressure decreasing mode, the ECU 26 controls the first vacuum pressure control valve 8 to close, the second vacuum pressure control valve 9 to open and the air control valve 11 to close. Then, the first and the second power cylinders 4 and 5 are connected with each other and the pressure difference therebetween decreases. As a result, the oil pressure in the master cylinder 12 decreases and the pressure in the wheel cylinders 17 through 20 decreases.

In the meantime, the brake booster 2, the first vacuum pressure control valve 8, the second vacuum pressure control valve 9, the air control valve 11 and the master cylinder compose an oil pressure control actuator in the first embodiment. Since the vacuum pressure introduced into the brake booster 2 is adjusted to control the brake oil pressure continuously in the ABS unit, smooth ABS control can be carried out. This is especially advantageous to the braking control device according to the present invention which handles high frequency vibration of the wheels since the interference of the vibration and the fluctuation of the oil pressure can be avoided.

Figure 2:
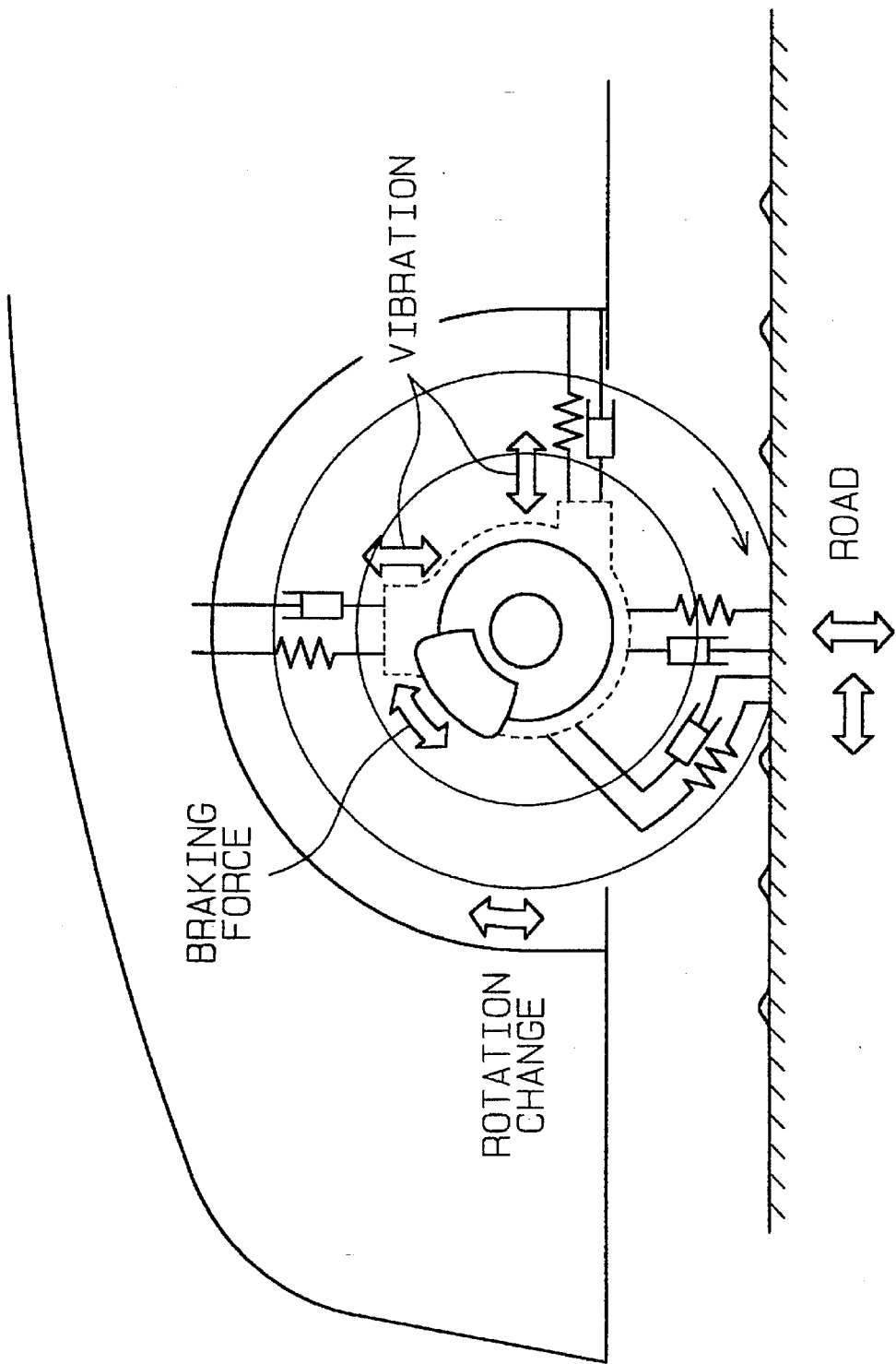
FIG. 2 is a schematic view illustrating a vibration model of the sprung portion of a vehicle according to the present invention.

There are suspension mechanisms including shock absorbing springs and other components, disk or drum brake mechanisms, axles, tires and wheels at the unsprung portions of the vehicle body as components of the unsprung members, which is illustrated in two dimensions in FIG. 2. As shown in FIG. 2, the unsprung portion is affected by the braking operation and road condition of the road surface in contact with the tire. That is, vertical or longitudinal vibration of the unsprung portion and fluctuation in rotational speed of the wheels are changed by the braking operation.

In the device according to the present invention, a load generated between the road surface and the tire during the braking operation is treated as a braking load, and a difference between a braking load which gives the wheels a maximum braking force and an actual braking load is treated as a marginal level of the braking operation. That is, the marginal level corresponds to a difference between Sa (the optimum slip ratio corresponding to the peak of a friction coefficient $\mu B$) and the actual slip rate. As the slip ratio becomes closer to Sa, the braking load increases, but the marginal level decreases to the contrary. The braking load of the device according to the present invention is detected from the motion of the vibration system (rotational speed change in the wheel rotational direction) to determine the marginal level of the braking operation, which can be given to a driver by an alarm 29 or the like.

Figure 3:
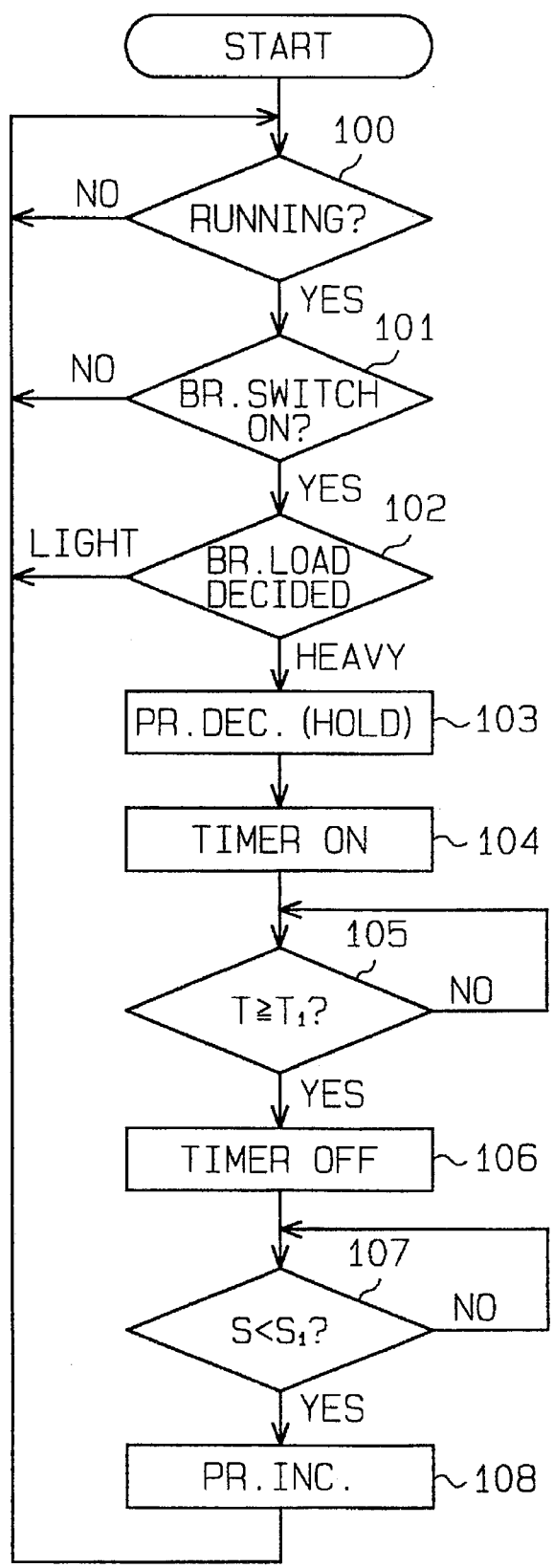
FIG. 3 is a flow chart showing ABS control of the first embodiment.
Figure 4:
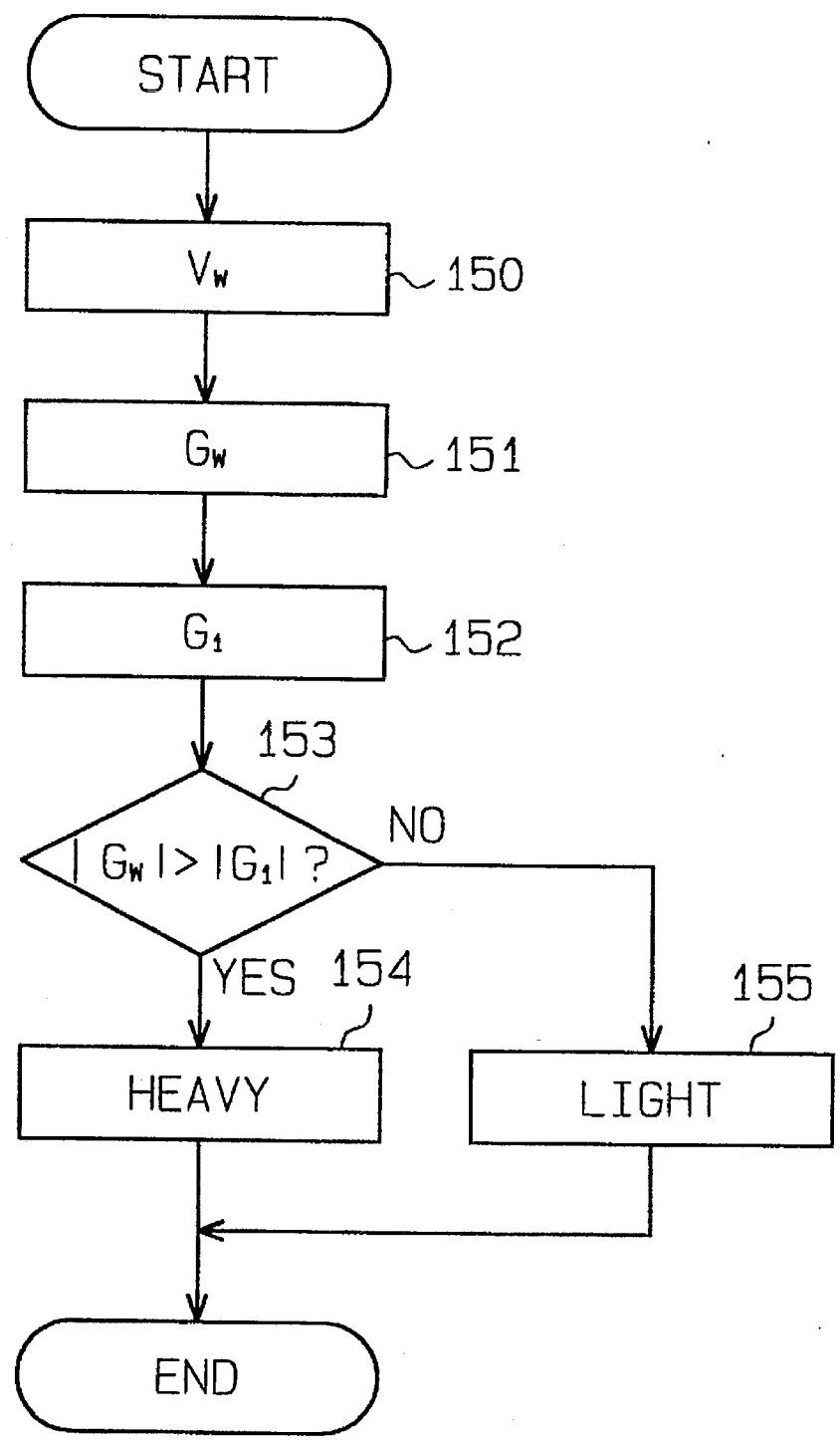
FIG. 4 is a flow chart showing steps for detecting the braking load of the first embodiment.
Figures 5A, 5B, 5C, 5D:
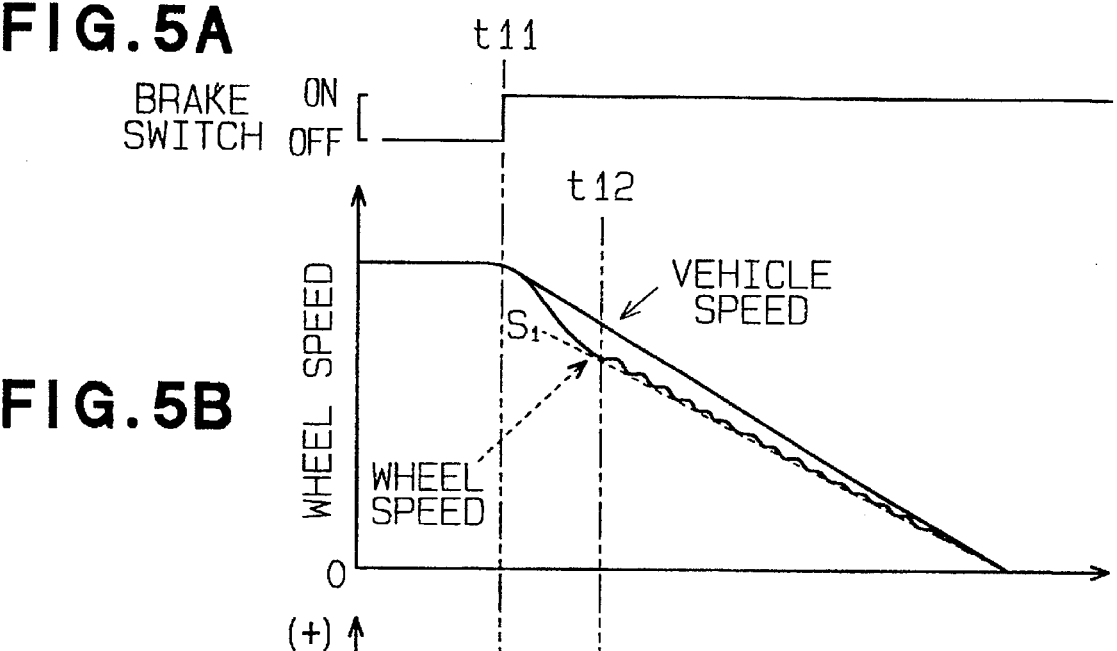
FIGS. 5A, 5B, 5C and 5D are timing charts showing the operation of the first embodiment.

The operation and function characteristics of the device according to the present invention will be described with reference to the drawings next. FIG. 3 is a flow chart of the control steps of the ABS unit and FIG. 4 is a flow chart of determining the braking load, both which are carried out by the ECU 26. FIGS. 5A, 5B, 5C and 5D are timing charts showing the motion of the vibration system during the braking operation.

When the control steps shown in FIG. 3 start, the ECU 26 determines whether the vehicle is running or not in a step 100 and determines whether the brake switch 27 is switched on or not in a step 101. As shown in the timing charts of FIGS. 5A, 5B, 5C and 5D, the step 101 determines NO before a timing t11 and the steps 100 and 101 are repeated. At the timing t11, both steps 100 and 102 determine YES and a step 102 follows. The ECU 26, then, determines the actual braking load according to a result to be described with reference to FIG. 4, and returns to the step 100 if the braking load is lighter than a designated value or proceeds to a step 103 if the braking load is heavier than a designated value.

FIG. 4 shows details of a program subroutine for the step 102 in which the decision whether the braking load is heavy or not is made. In FIG. 4, the ECU 26 calculates a wheel speed $V_W$ according to the output signals of the wheel speed sensors 22 through 25 in a step 150, and calculates a wheel acceleration $G_W$ from the differentiation of the wheel speed $V_W$ in the next step 151. Thereafter, the ECU 26 sets a reference load level G1 in response to the surface condition μ of the road in contact with the wheel tire (which is calculated from the gain of steering to an amount of force applied to a steering wheel, or reaction force from the road) in a step 152. The reference load level G1 corresponds to a reference level of maximum braking force which is determined on the basis of a maximum wheel acceleration $G_{MAX}$ (maximum braking deceleration) calculated from the above surface condition μ. The wheel acceleration $G_W$ oscillates vertically in FIG. 5B in response to longitudinal vibration of the vehicle and vibration in the direction of the wheel rotation. The reference load level G1 is set to be a designated level which is greater than the maximum wheel acceleration $G_{MAX}$ in the minus (−) direction. In the meantime, the reference load level G1 can be decided simply as a constant value from a maximum value which is a designated level greater than a practically maximum road surface condition μ (e.g., 1.0).

Thereafter, the ECU 26 compares the absolute value of the above wheel acceleration $G_W$ (or the wheel deceleration) with the absolute value of the reference load level G1 in a step 153. If $|G_W|>|G1|$, the ECU 26 proceeds to a step 154 and decides that the braking load is heavy, and if $|G_W|\leq|G1|$, it proceeds to a step 155 and decides that the braking load is light. In other words, when the slip ratio becomes Sa shown in FIG. 6B (the optimum slip ratio corresponding to the peak of the $μ_B$), the oscillation wave amplitude of the wheel acceleration $G_W$ is increased by the rotational speed change of the wheel and the inequality $|G_W|>|G1|$ is satisfied. YES and NO decisions in the step 153 are alternately made at peak portions of the wheel acceleration $|G_W|$ after time t12 in FIGS. 5B–5D.

When the braking load of a certain wheel is decided to be heavy, the ECU 26 controls the brake oil pressure according to the steps 103 through 108. That is, the ECU 26 proceeds to the step 103 and sets the control mode to the pressure decreasing mode (or the pressure holding mode). Accordingly, ABS actuators (control valve 8, 9 and 11) are controlled according to the pressure decreasing mode (or the pressure holding mode) and pressure increase of the brake oil is restrained. Then the ECU 26 switches a timer T on in a step 104 and decides whether ON time of the timer passes a designated time T1 ( shortest time period, e.g., a few to several ten milliseconds, in which a delicate adjustment is possible) in the next step 105. In other words, the pressure decreasing time is detected in the steps 104 and 105. When T≦T1, the ECU 26 proceeds to a step 106 and switches the timer T off.

Thereafter, the ECU 26 proceeds to a step 107 and decides whether the current slip ratio S is smaller than the reference level S1 or not (that is, whether the slip of the wheel at deceleration comes to a permissible level or not), and whether or not the slip increases suddenly because of sudden change of the μ-S characteristic between the road surface and the wheel tire is decided. If NO is decided in the step 107, the ECU 26 holds the pressure decreasing mode (or pressure holding mode) until YES is decided in the step 107. Then, the ECU 26 changes the ABS control mode to the pressure increasing mode in a step 108, and returns to the step 100.

Figure 6B:
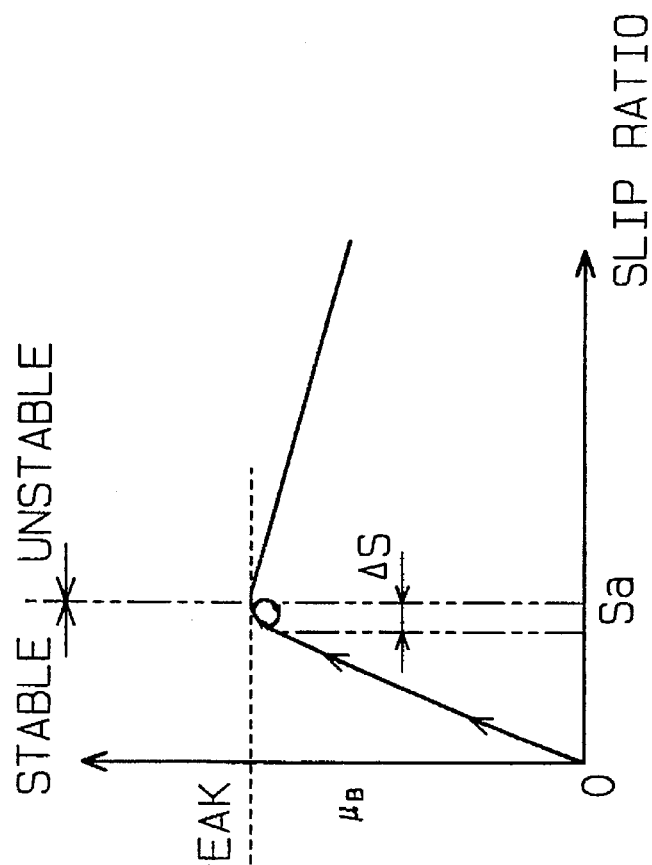
FIGS. 6A and 6B are charts showing μB characteristics.
Figure 6A:
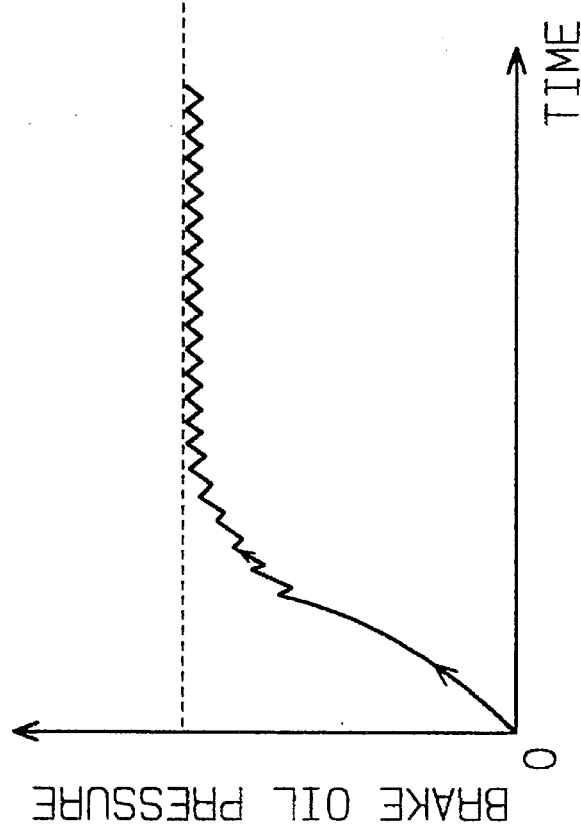

According to the above steps, the slip ratio Sa becomes a level to start decreasing the oil pressure as shown in FIGS. 6A and 6B and is controlled within a narrowly limited range ΔS around the ratio Sa. Even if decreasing and increasing of the brake oil pressure are repeated, the surface condition $μ_B$ is maintained at a comparatively a high level in a stable range so that excessive increase or decrease in the brake oil pressure is not expected. That is, the pressure decreasing level (Sb shown in FIG. 17B will not shift to an unstable range as the conventional device will do significantly, thereby resulting in good braking control in an optimum slip range.

In the ABS unit in which the brake oil pressure does not fluctuate, since the fluctuation of the brake force does not affect the motion of the unsprung portion, the braking load is detected with high accuracy.

SECOND EMBODIMENT

Next, an ABS unit according to a second embodiment of the present invention will be described, focussing on differences thereof from the first embodiment. In the first embodiment, the braking condition is decided according to the change in the rotational speed over the entire frequency range (steps shown in FIG. 4). On the other hand, in the device according to the second embodiment, the braking condition is decided according to oscillation power level (vibration characteristic) of the wheel speed in a specific frequency (steps shown in FIG. 7). In the second embodiment, the ECU 26 forms an operation detecting unit (a wheel rotational speed detection unit and an oscillation detecting unit), brake operation detecting unit and brake control detecting unit.

Figure 7:
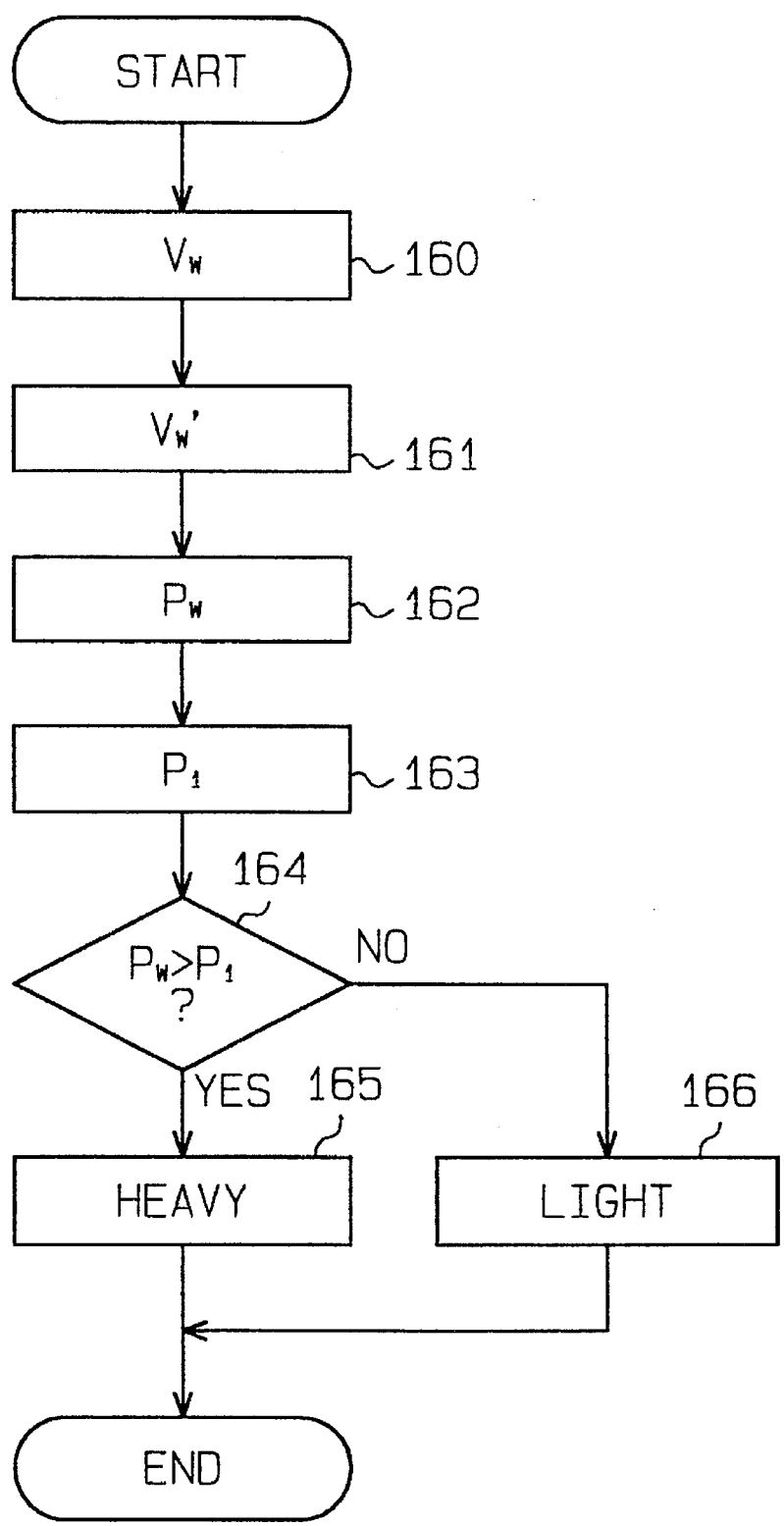
FIG. 7 is a flow chart showing steps for detecting the braking load of a second embodiment.

FIG. 7 is a flow chart showing details of deciding steps of the braking load which are replaced with the steps of the first embodiment shown in FIG. 4. FIGS. 8A–8E are timing charts showing details of the braking operation.

When the steps shown in FIG. 7 start, the ECU 26 calculates each wheel speed $V_W$ from the output signals of the sensors 22 through 25 in a step 160, and produces a wheel rotational speed $V_W'$ in a specific frequency range using a BPF (band-pass filter) or the like at a step 161. Thereafter, an effective value of the wheel rotational speed in a specific frequency range (in a period in which the wheel rotational speed at a specific frequency range can be calculated) is calculated, and the effective value is set a power level $P_W$ of oscillation in a step 162.

Then, the ECU 26 sets a reference load level P1 according to the vehicle running condition at a step 163. The reference load level P1 is given by a characteristic line L1 shown in FIG. 8D, which is set according to a previous characteristic line and vehicle running condition (acceleration in the lateral direction during steering operation, vehicle motion or road surface condition). The reference load level P1 on the line L1 is a value based on a vibration power level $P_W$ in a specific frequency range which corresponds to a maximum reference braking force and corresponds to the maximum braking force which is available in that instance. The characteristic line L1 may be a value which is memorized during each vehicle running or a value calculated as a function each time the brake switch 27 is turned on.

Thereafter, the ECU 26 compares the power level $P_W$ of oscillation with the reference load level P1 in a step 164. If $P_W>P1$, the ECU 26 proceeds to a step 165 and decides that the braking load is heavy. If $P_W<P1$, it proceeds to a step 166 and decides that the braking load is light. In other words, when the slip ratio S becomes Sa (the optimum slip ratio which corresponds to the peak of $μ_B$) as shown in FIG. 6B, the vibration power level $P_W$ in a specific frequency range increases and the inequality $P_W > P1$ is satisfied. Thus, YES is decided in the step 164.

After t15 in the timing charts shown in FIGS. 8A through 8D, the brake switch 27 is turned on and the vibration power level $P_W$ goes up and down from the characteristic line L1. Then, the vibration power level $P_W$ is compared with the current reference load level P1, and YES and NO are repeated in the step 164 shown in FIG. 7.

According to the second embodiment, the slip ratio Sa (optimum slip ratio corresponding to the μB peak) shown in FIG. 6B becomes the starting point of decreasing the brake oil pressure as in the first embodiment so that the slip ratio is controlled within a limited range (ΔS in FIG. 6B) around Sa, thereby maintaining μB at a relatively high level in a stable range.

In this embodiment, the steps 161 through 164 are used, in which the wheel speed $V_W'$ (a component of a specific frequency) is converted to the power level $P_W$, which is compared with the reference load level to decide the braking load. However, the step (step 162) of converting the wheel speed $V_W'$ at the specific frequency to the vibration power level $P_W$ can be omitted with change of the steps 163 and 164 as follows. That is, in the step 163, a reference load level V1' to decide the amplitude of the wheel speed $V_W'$ after the BPF is set according to the vehicle running condition is used and, in the step 164 the wheel speed $V_W'$ in the specific frequency is compared with the reference load level V1' is used. Thus, the braking load is decided by comparison between $[V_W']$ and $[V1']$ (when $V_W' > V1'$, the braking load= heavy), resulting in similar effects for the optimum braking force control.

THIRD EMBODIMENT

An ABS unit according to a third embodiment of the present invention will be described, focussing on differences thereof from the first embodiment. In the first embodiment, the braking condition is decided according to the change in the rotational speed. On the other hand, in the device according to the third embodiment, the braking condition is decided according to frequency characteristics of the wheel acceleration. In the third embodiment, the ECU 26 functions as a motion detecting unit (a wheel acceleration detecting unit and a frequency analyzing unit), a braking operation detecting unit and a braking force control unit.

Figure 9:
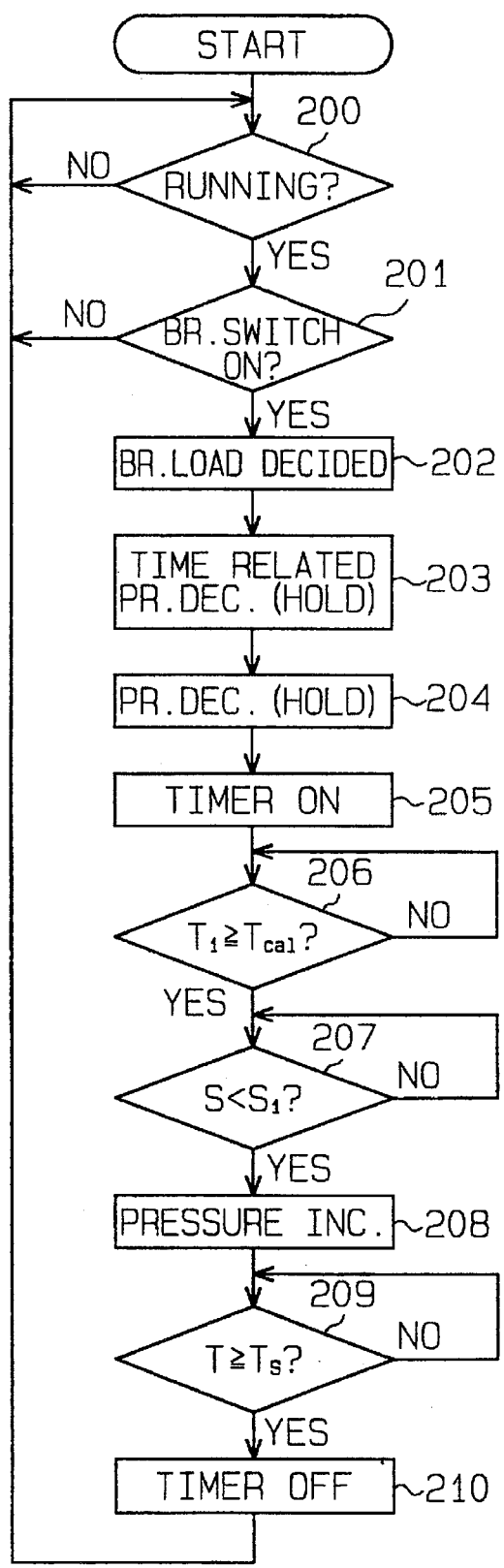
FIG. 9 is a flow chart showing ABS control of a third embodiment.
Figure 10:
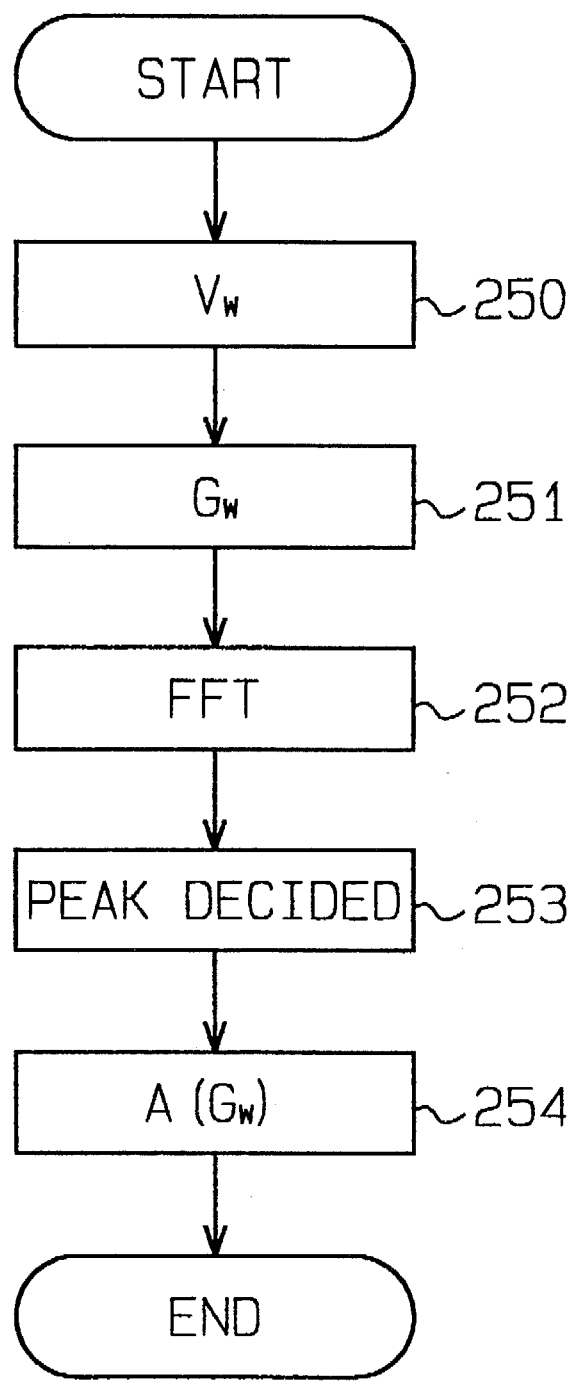
FIG. 10 is a flow chart showing steps for detecting the braking load of the third embodiment.

FIG. 9 is a flow chart showing ABS operation according to the third embodiment, FIG. 10 is a flow chart showing calculation steps of the braking load in a subroutine of the program shown in FIG. 9, and FIGS. 11A, 11B, 11C and 11D are timing charts showing motion during the braking operation.

In FIG. 9, the ECU 26 decides whether the vehicle is running or not in a step 200 and whether the brake switch is turned on or off is decided in a step 201. If YES is decided in both steps, the next step 202 follows. YES is decided in both steps 200 and 201 at a timing t21 of the timing charts shown in FIGS. 11A through 11D. Thereafter in the step 202, the ECU 26 decides the braking condition according to analysis data of the wheel acceleration $G_W$ (wheel rotational speed acceleration).

Calculation steps of the brake load are shown in FIG. 10. In FIG. 10, the ECU 26 calculates the wheel rotational speed $V_W$ of the respective wheels in a step 250 and calculates the wheel acceleration $G_W$ in a step 251. Thereafter, the ECU 26 regulates the waveform of the wheel deceleration $G_W$ by a FFT (fast Fourier transform) circuit or a filter, and converts data of the wheel acceleration relative to the time into data relative to the frequency. Then, the ECU 26 proceeds to a step 253 to decide a peak gain in a specific frequency range between f1 and f2 (e.g., 20~50 Hz) by a predetermined range ΔG (maximum reference braking force), and calculates braking load data $A(G_W)$ which correspond to an excess of the predetermined range ΔG in the following step 254. The specific frequency range between f1 and f2 are set to include a resonant frequency of the unsprung portion of the vehicle. The reference value AG is set after cancelling the white noise level (due to roughness of the road surface and electric noise).

Figure 12A:
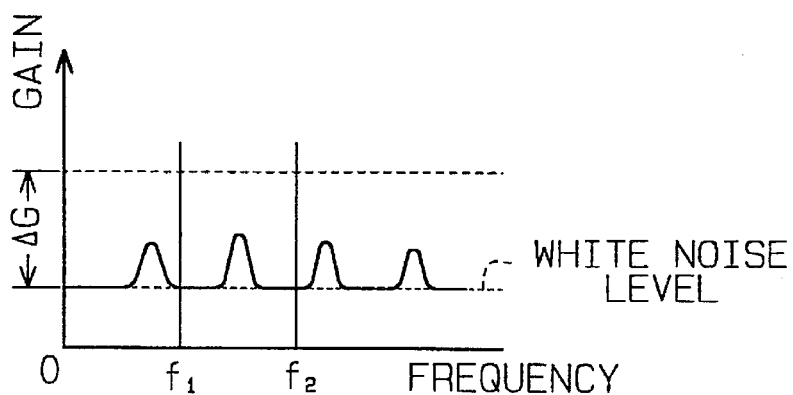
FIGS. 12A, 12B and 12C are timing charts showing the operation of the third embodiment.
Figure 12B:
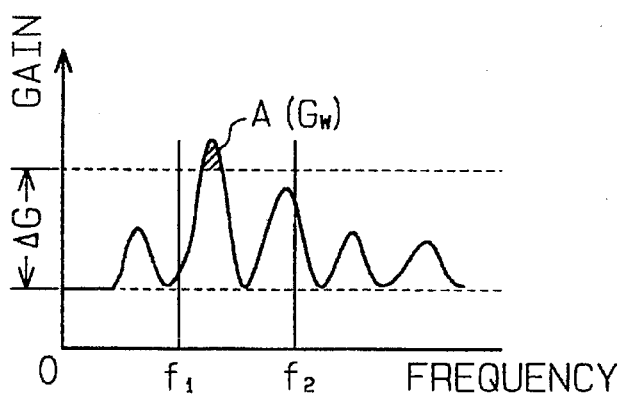
Figure 12C:
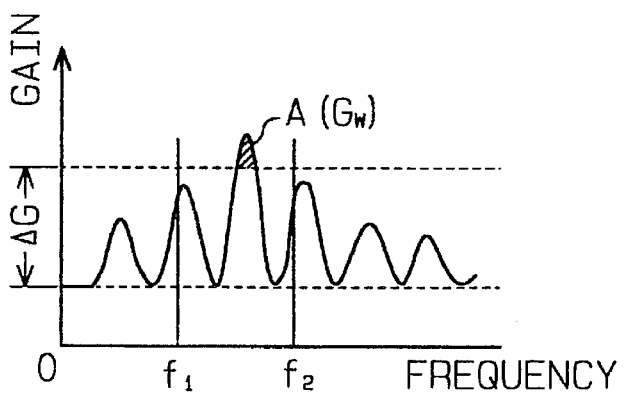

FIGS. 12A, 12B and 12C show respective data of the wheel acceleration $G_W$ relative to the frequency at timings t22, t23 and t24. In other words, the peak gain in the specific frequency range between f1 and f2 at the timing t22 in FIGS. 11B–11D is lower than an upper limit of the reference value ΔG as shown in FIG. 12A and the braking load data $A(G_W)$ becomes ⌈0⌋. The peak gain of the specific frequency range between f1 and f2 at timings t23 and t24 in FIGS. 11B–11D is higher than the upper limit of the reference value ΔG as shown in FIGS. 12A and 12C, and the braking load data $A(G_W)$ corresponding to an area of the peak gain which is higher than the reference value ΔG is calculated.

The ECU 26 proceeds to a step 203 shown in FIG. 9 after calculating the braking load data and calculates a pressure decreasing time (or pressure holding time) Tcal through the following equation (1).

$$T_{cal} = a \cdot A(G_W) + b \qquad (1)$$

wherein a and b are constants.

The ECU 26 sets the ABS unit in the pressure decreasing mode (or the pressure holding mode) in the next step 204, and drives the ABS actuators (the control valves 8, 9 and 11) according to the set mode. Thereafter, the ECU 26 switches the timer T on in a step 205 and decides whether the timer on-time passes the pressure decreasing time Tcal calculated in the step 203 or not in the next step 206. When T≧Tcal, the ECU 26 proceeds to a step 207 and decides whether the slip ratio S is smaller than a predetermined reference ratio S1 or not (that is, whether or not the wheel decelerating slip becomes smaller than a permissible range), and whether or not the slip changes suddenly due to sudden change of the μ–S characteristic between the wheel tire and the road surface. If NO is decided in the step 207, the ECU 26 holds the pressure decreasing mode (or pressure holding mode) until YES is decided in the step 207. Thereafter, the ECU 26 changes the ABS mode to the pressure increasing mode in a step 208.

The ECU 26 decides whether or not the on-time of the timer T passes a predetermined pressure decreasing time Ts, and if T ≧Ts, it proceeds to the next step 210. The ECU 26 switches the timer T off in the step 210 and returns to the step 200.

The control device according to the third embodiment detects the braking operation accurately by the use of the wheel acceleration data relative to the frequency which is regulated by a FFT circuit to achieve the same object of the present invention as the first embodiment.

FOURTH EMBODIMENT

An ABS unit according to a fourth embodiment of the present invention will be described, focussing on differences thereof from the third embodiment.

In the third embodiment, the braking operation is detected through the frequency analysis data of the wheel acceleration $G_W$. On the other hand, in the fourth embodiment the braking operation is detected through the acceleration in the vibration of the unsprung portion of the vehicle. In other words, acceleration sensors composed of strain gauges, piezoelectric elements or the like are disposed at link portions of the vehicle suspension or portions of axles (knuckles) to detect acceleration in longitudinal, vertical and lateral vibration. In this fourth embodiment, the vibration acceleration detecting unit is composed of the acceleration sensor and the ECU 26 functions as the motion detecting unit (frequency analyzing unit), the braking operation detecting unit and the braking force control unit.

Figure 13:
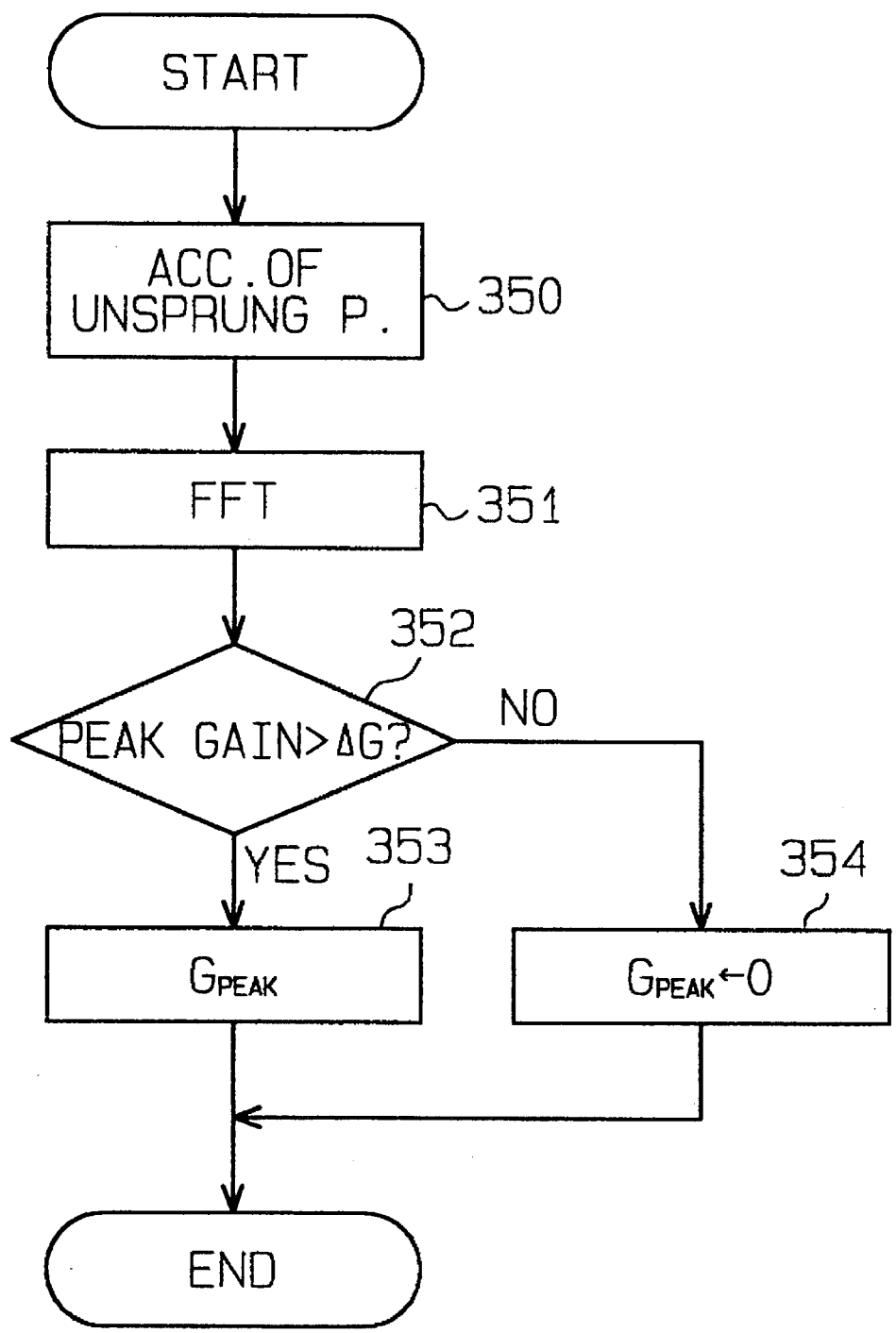
FIG. 13 is a flow chart showing steps for detecting the braking load of a fourth embodiment.

FIG. 13 is a flow chart showing detection of the braking force in the fourth embodiment, and FIGS. 14A, 14B, 14C and 14D are timing charts showing the motion of various portions of a vehicle in the braking operation.

In FIG. 13, the ECU 26 calculates an amount of the acceleration of the unsprung portion according to the output signal of the acceleration sensor in a step 350, and regulates the acceleration of the unsprung portion by a FFT circuit and converts the time related acceleration data to frequency related acceleration data in a step 351. Then the ECU 26 proceeds to a step 352, and decides whether or not a peak gain in a specific frequency range between f3 and f4 (e.g., 0.5–2 kHz) exceeds an upper limit (maximum reference braking force) of a predetermined reference range ΔG. If the peak gain is greater than ΔG, the ECU 26 proceeds to a step 353 to calculate braking load data $G_{PEAK}$ according to the peak gain. If the peak gain is not greater than ΔG, the ECU 26 proceeds to a step 354, and makes the braking load data $G_{PEAK}$ ⌈0⌋. The specific frequency range between f3 and f4 is set within a range where the vibration frequency generated during slipping between the road surface and the wheel tire can be detected.

Figure 15A:
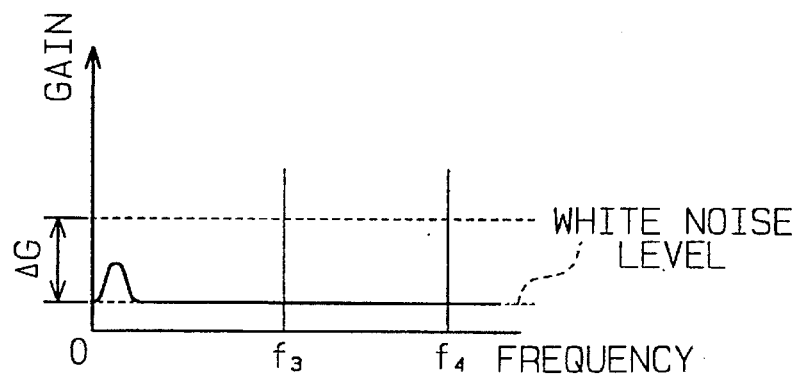
FIGS. 15A, 15B and 15C are timing charts showing the operation of the fourth embodiment.
Figure 15B:
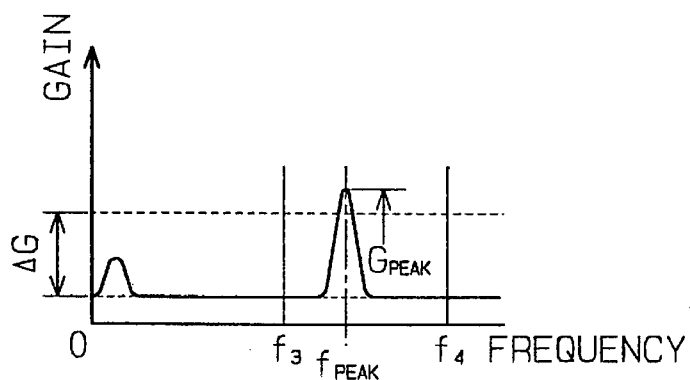
Figure 15C:
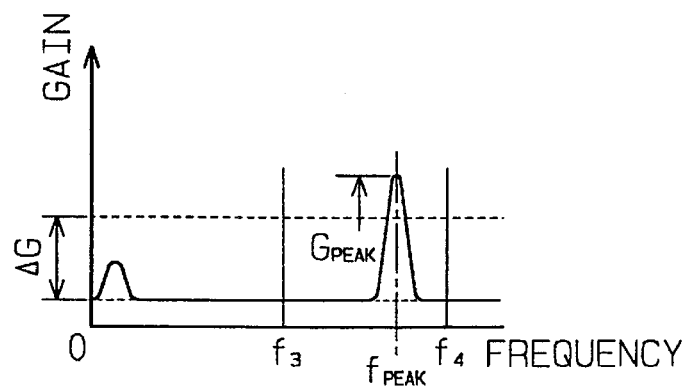

FIGS. 15A, 15B and 15C show the frequency related acceleration data of the vibration at timings t32, t33 and t34 respectively. That is, the peak gain in the specific frequency range between f3 and f4 at the timing t32 in FIGS. 14A through 14D is lower than the upper limit of the reference range ΔG as shown in FIG. 15A, and the braking load data $G_{PEAK}$ is made ⌈0⌋. The peak gain at the timing t33 and t34 in the specific frequency range between f3 and f4 exceeds the upper limit of the reference range ΔG as shown in FIGS. 15B and 15C, and the braking load data $G_{PEAK}$ which correspond to the area of the peak exceeding the upper limit at the timings are calculated.

The control steps of the ABS control for the above operation are carried in the same manner as in FIG. 9, and the pressure decreasing time Tcal (or the pressure holding time) which corresponds to the above braking load data $G_{PEAK}$ is calculated according to the following equation (2) in the step 203 of FIG. 9.

$$Tcal = a \cdot G_{PEAK} + b \quad (2),$$

wherein a and b are constants.

The braking load data can be detected from the change in the peak frequency of the vibration (change in the grounding affects the frequency of the vibration). In this case, the above equation (2) is replaced by the following equation (3) in which the frequency $f_{PEAK}$ which is the frequency when the data $G_{PEAK}$ is generated.

$$Tcal = a \cdot f_{PEAK} + b \quad (3),$$

wherein a and b are constants.

In the fourth embodiment, with the FFT circuit for regulating the frequency related data of the acceleration of the vibration, the braking operation can be detected precisely, and objects of the present invention can be achieved as in the first through third embodiments.

FIFTH EMBODIMENT

Figure 16:
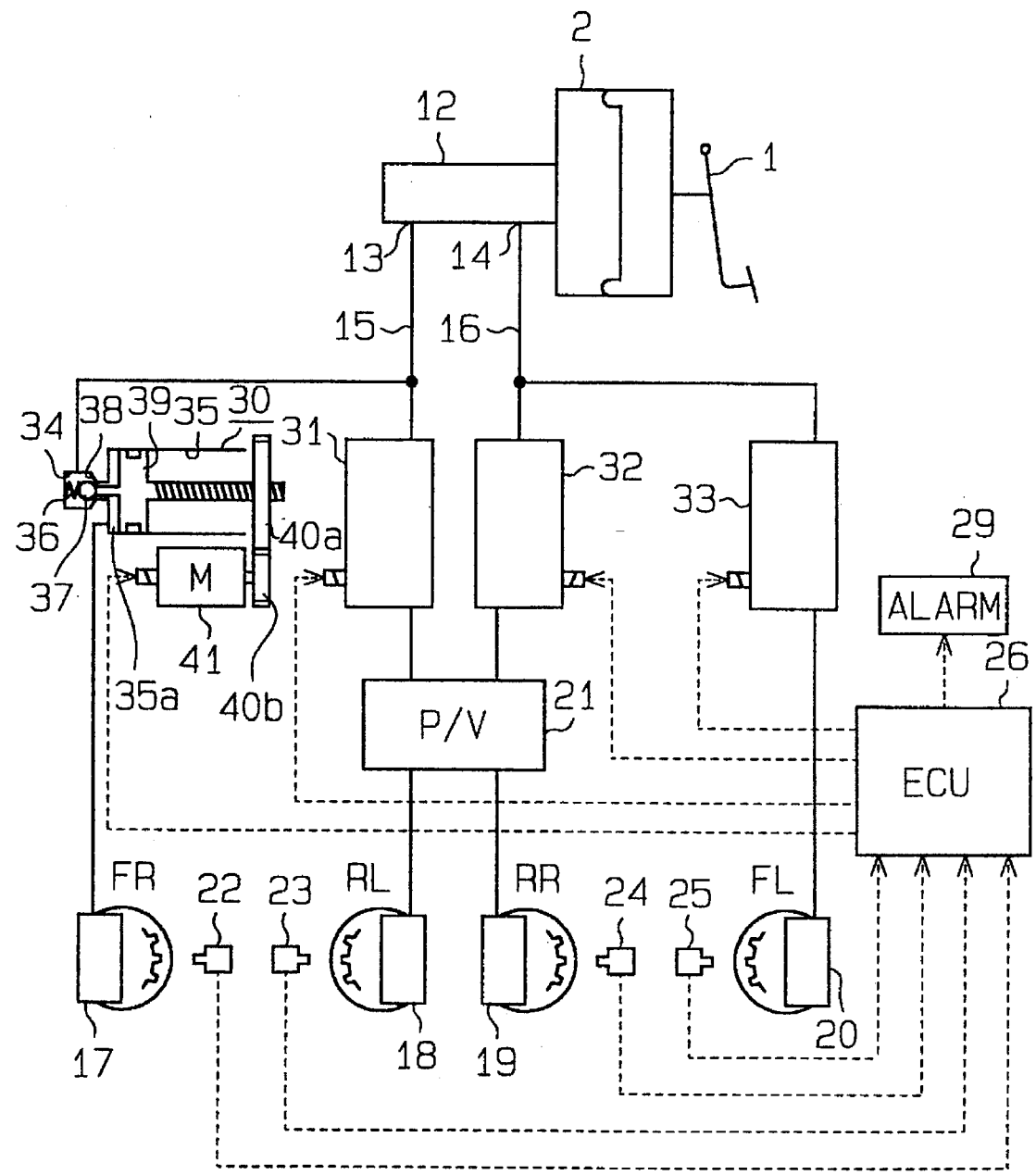
FIG. 16 is a circuit diagram illustrating general structure of an ABS unit for a vehicle according to a fifth embodiment.

In a fifth embodiment of the present invention, the ABS unit is modified as shown in FIG. 16. In FIG. 16, a brake pedal 1 is connected to a booster 2, which is connected tandem to a tandem type master cylinder 12. A first pressure oil port 13 of the master cylinder 12 is connected through a first pressure oil pipe 15 to wheel cylinders 17 and 18, and a second pressure oil pipe 14 is connected through a second pressure oil pipe 16 to wheel cylinders 19 and 20.

ABS linear actuators 30 through 33 which change the brake oil pressure of the wheels linearly are disposed in the respective pressure oil pipes 15 and 16 which connect the master cylinder 12 and the wheel cylinders 17 through 20 for the respective wheels. In other words, in the fifth embodiment, the ABS linear actuators 30 through 33 compose an oil pressure control actuator.

The ABS linear actuator 30, which is one of the above actuators, has a valve chamber 34 and a piston chamber 35. A generally spherical valve body 37 is disposed in the valve chamber 34 and biased against a valve seat 38 by a coil spring 36, and a piston 39 is inserted into the piston chamber 35 to slide therein. The piston 39 is connected to a motor 41 through a pair of gears 40a and 40b.

When the valve body 37 stays apart from the valve seat as shown in FIG. 16, the brake oil pressure increases. The motor 41 drives the piston 39 to the right in FIG. 16. When the piston 39 stops with the valve body 37 abutting the valve seat 38, the brake oil pressure is held constant. When the piston is driven further to the right, the volume of a left oil pressure control chamber 35a increases and the brake oil pressure is decreased. Suction or discharge of the brake oil between the piston 39 and the wheel cylinder 17 by the reciprocating motion of the piston 39 increases, holds or decreases the brake oil pressure.

The above ABS unit also achieves objects of the present invention with the same operational steps as in the previously described first through fourth embodiments. Since the volume of the oil pressure chamber 35a is changed linearly, fluctuation of the brake oil pressure can be prevented with accurate detection of the braking load.

The present invention can be realized further as follows in addition to the embodiments previously described.

(1) The reference load level G1 is calculated according to the road surface condition μ in contact with the wheel tire in the step 152 shown in FIG. 4 according to the first embodiment, however, the reference load level G1 may be calculated as follows. That is, a center level of the amplitude of the wheel acceleration $G_W$ is calculated first, and the reference load level G1 is calculated from time to time at "the center level+α" (α is a fixed value increasing toward the minus direction).

(2) The peak level in a specific frequency range is detected from the wheel acceleration or the acceleration of the unsprung portion which is regulated by a FFT circuit, however, it can be detected by the use of a BPC (band-pass filter) which produces specific frequency components.

(3) The braking operation can be detected in the following manner in addition to the above embodiments.

Physical change relating to the motion of the unsprung portion such as sound generated at the unsprung portion, suspension stroke, load of the suspension (stress), load of the axle (stress), load of the wheel tire (stress) or the like is detected and the braking operation is detected from the peak gain of the above data in a specific frequency range or a frequency change rate.

(4) The braking load data are calculated from the frequency related data of the wheel acceleration $G_W$ in the third embodiment, however, the braking load data may be calculated from the frequency related data of the fluctuation of the wheel speed $V_W$.

(5) A reference value relative to $\mu_B$ peak is used to detect the braking operation in the above embodiments, however the braking operation may be detected before $\mu_B$ peak, taking the response delay time of the actuators into account. In other words, the increase of the slip may be accelerated in conventional actuators on account of the response delay, however, this problem can be solved.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A braking force control device comprising:
   means for applying braking force to a vehicle;
   means for detecting vibration level of a wheel when said braking force is applied;
   means for determining a present brake condition based on a vibration level detected by said vibration level detecting means and a predetermined vibration level range of a maximum braking region; and
   means for controlling said braking force applying means so that said vibration level determined by said vibration level detecting means is within said predetermined vibration range based on said present brake condition determined by said present brake condition determining means.

2. A braking force control device as claimed in claim 1, wherein:
   said braking force changing means is for changing braking force to be applied to said wheel at least in a direction to increase or to decrease, and is for restraining increase of said braking force when said braking operation is decided to exceed an upper limit of said braking range.

3. A braking force control device as claimed in claim 1, wherein:
   said vibration level detecting means is for detecting said vibration level which is generated along with rotational change of said wheel when said brake is applied, and
   said actual braking operation deciding means is for deciding said actual braking operation according to said rotational change of said wheel.

4. A braking force control device as claimed in claim 3, wherein said vibration level detecting means comprises means for detecting rotational speed of said wheel.

5. A braking force control device as claimed in claim 3, wherein said vibration level detecting means comprises means for detecting rotational acceleration of said wheel.

6. A braking force control device as claimed in claim 1, wherein:
   said vibration level detecting means is for detecting vibration level of an unsprung portion of said vehicle.

7. A braking force control device as claimed in claim 6, wherein said vibration level detecting means comprises means for detecting acceleration of vibration of said unsprung portion.

8. A braking force control device as claimed in claim 3, wherein:
   said vibration level detecting means comprises means for detecting rotational speed signal of said wheel and means for detecting a peak characteristic of said rotational speed signal in a specific frequency range, and
   said means for determining a present brake condition decides said actual braking operation of said vehicle according to said peak characteristic of said rotational speed signal in said specific frequency range.

9. A braking force control device as claimed in claim 3, wherein:
   said vibration level detecting means comprises means for detecting wheel acceleration signal and means for detecting a peak characteristic of said wheel acceleration signal in a specific frequency range, and
   said actual braking operation deciding means is for deciding said actual braking operation of said vehicle according to said peak characteristic of said wheel acceleration signal in said specific frequency range.

10. A braking force control device as claimed in claim 6, wherein:
    said vibration level detecting means comprises means for detecting acceleration of vibration of said unsprung portion and means for detecting a peak characteristic of said acceleration of vibration in a specific frequency range, and
    said means for determining a present brake condition decides said actual braking operation of said vehicle according to said peak characteristic of said acceleration of vibration in a specific frequency range.

11. A braking force control device as claimed in any one of claims 1 through 10 further comprising:
    an oil pressure control actuator for regulating pressure oil to be supplied to a wheel cylinder for said wheel continuously,
    wherein said braking force changing means is for driving said oil pressure control actuator according to said actual braking operation.

12. A braking force control device as claimed in claim 1, said device further comprising:
    means for detecting slip of said wheel,
    wherein said braking force changing means is for restraining increase of said braking force when either one of levels of said braking operation and said slip exceeds a respective reference level.

13. A method of controlling braking force for a vehicle comprising steps of:
    applying braking force to a vehicle wheel;
    detecting motion change of said wheel when said braking force is applied;
    determining a present brake condition based on said detected motion change and a predetermined vibration level range for said maximum braking region; and
    changing braking force to be applied to said wheel so that said detected motion change is within said predetermined vibration level range based on said determined present brake condition.

14. A method of controlling braking force for a vehicle as claimed in claim 13, wherein said braking force changing step comprises steps of:

changing said actual braking force at least in a direction to increase or to decrease, and restraining increase of said braking force when said actual braking operation exceeds an upper limit of said braking force range.

15. A method of controlling braking force for a vehicle as claimed in claim 13, wherein:

said step of detecting motion change comprises a step of detecting said motion change which is generated along with rotational change of said wheel when said brake is applied, and said step of determining a present brake condition comprises a step of deciding said actual braking operation according to said rotational change of said wheel.

16. A method of controlling braking force for a vehicle as claimed in claim 13, wherein said step of detecting motion change comprises a step of detecting rotational speed of said wheel.

17. A method of controlling braking force for a vehicle as claimed in claim 13, wherein said step of detecting motion change comprises a step of detecting rotational acceleration of said wheel.

18. A method of controlling braking force for a vehicle as claimed in claim 13, wherein:

said step of detecting motion change comprises a step of detecting vibration change of an unsprung portion of said vehicle, and said step of determining a present brake condition comprises a step of deciding said actual braking operation according to said vibration change of said unsprung portion.

19. A method of controlling braking force for a vehicle as claimed in claim 13, wherein said step of detecting motion change comprises a step of detecting acceleration of vibration of said unsprung portion.

* * * * *